March 7, 1950 D. C. LUTZ 2,499,660
SANITARY BUTTER CUTTER
Filed Jan. 28, 1947 4 Sheets-Sheet 1
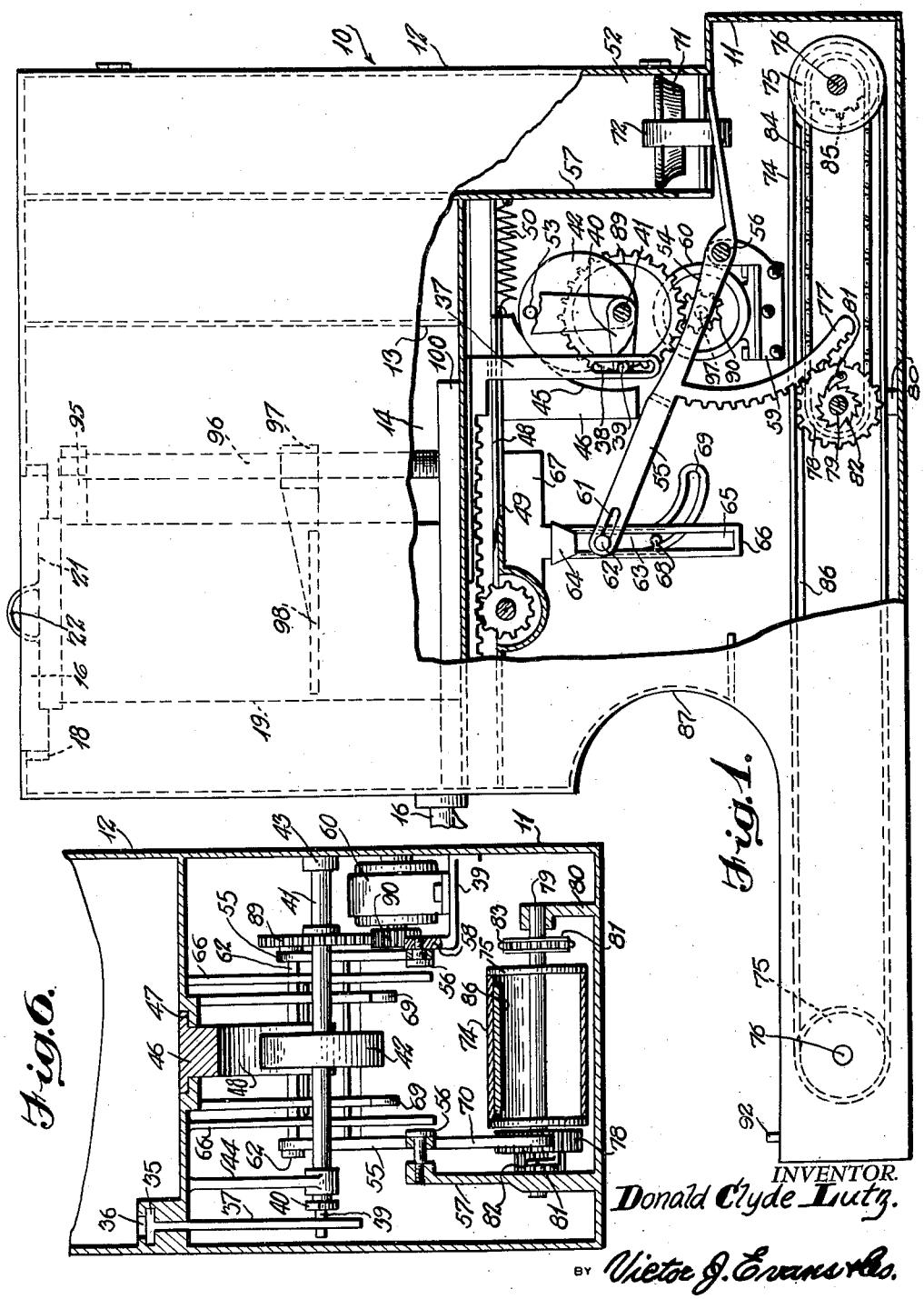
INVENTOR.
Donald Clyde Lutz.
BY Victor J. Evans & Co.
ATTORNEYS

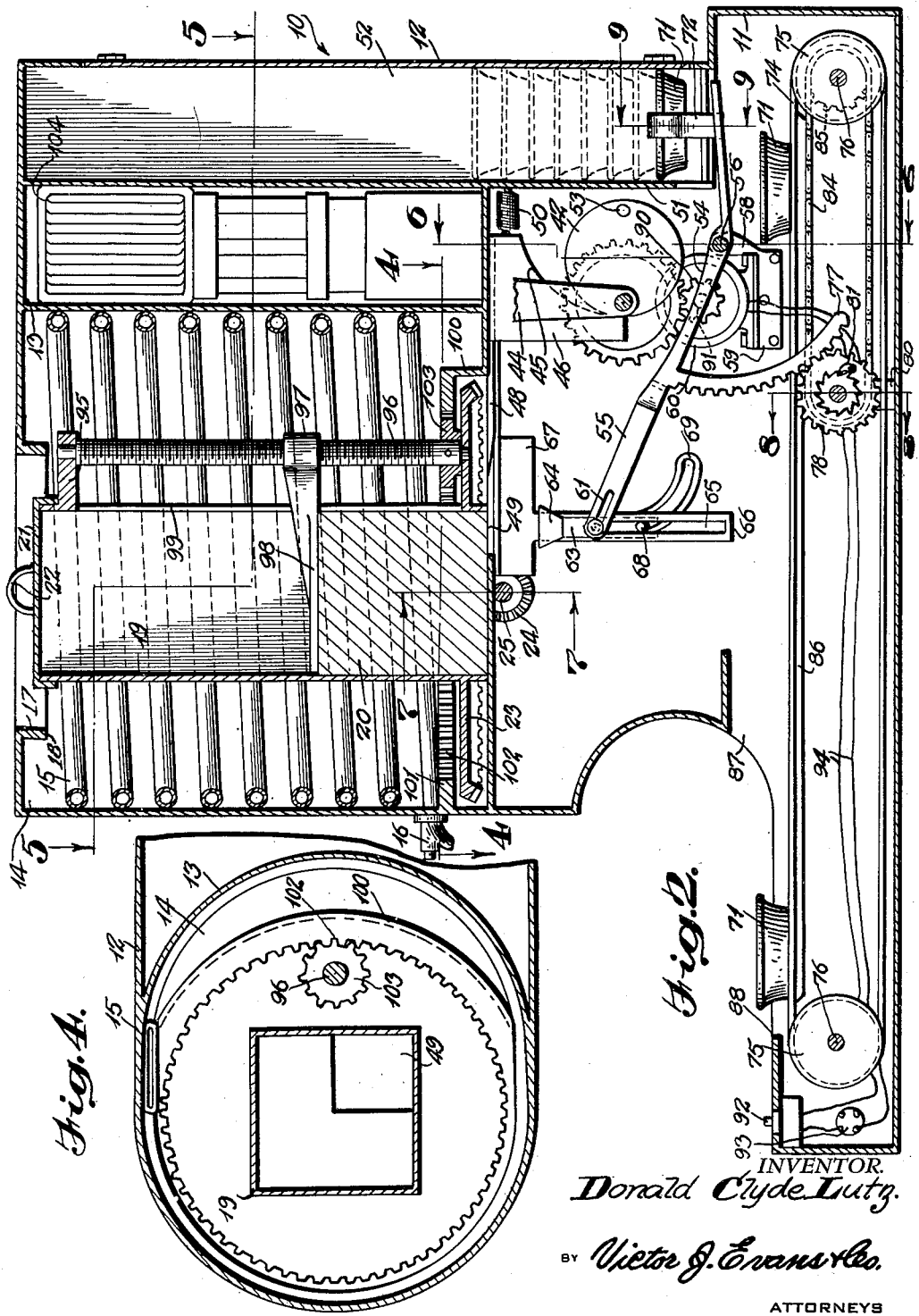

March 7, 1950  D. C. LUTZ  2,499,660
SANITARY BUTTER CUTTER
Filed Jan. 28, 1947  4 Sheets-Sheet 3
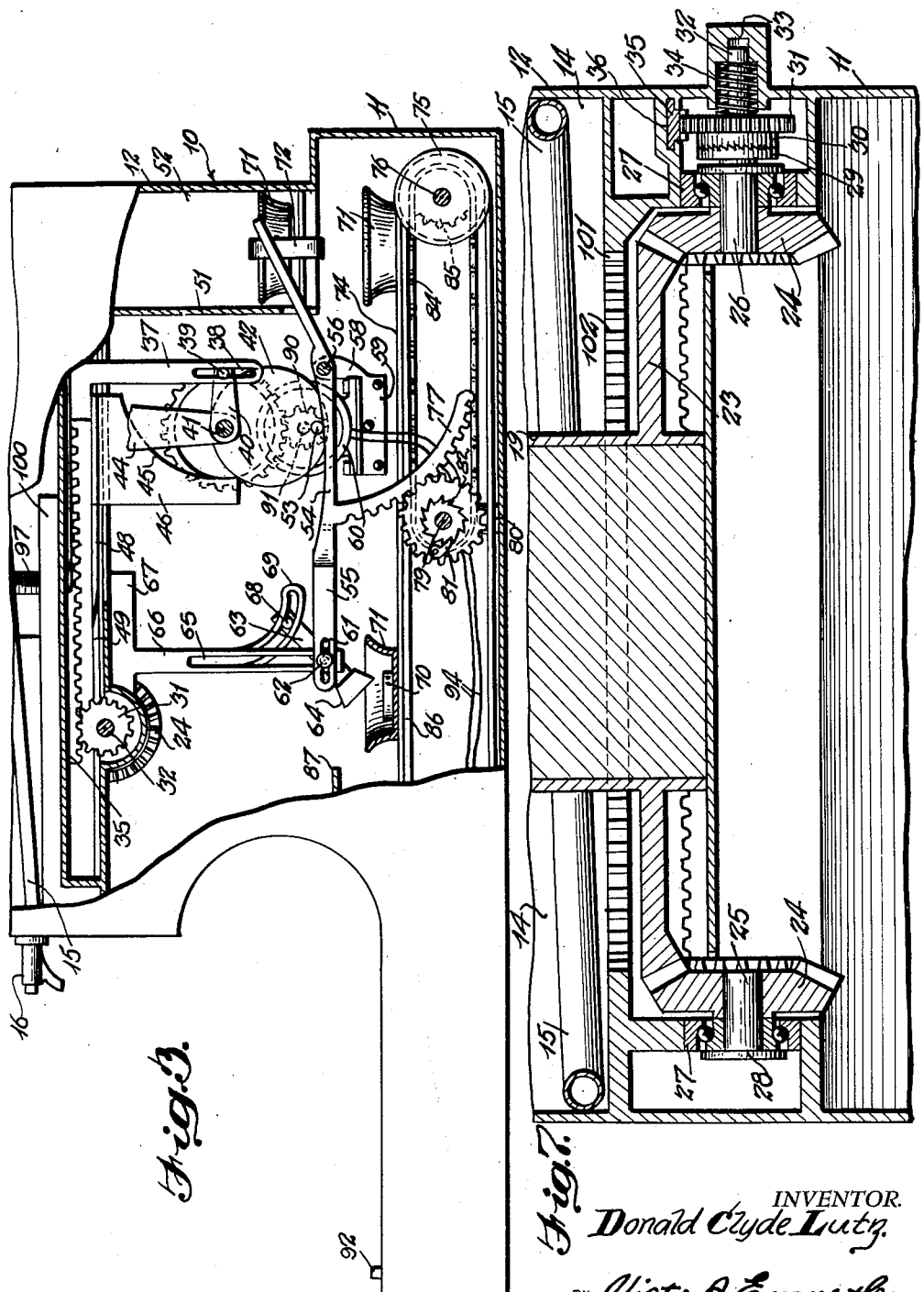
INVENTOR.
Donald Clyde Lutz.
BY Victor J. Evans & Co.
ATTORNEYS

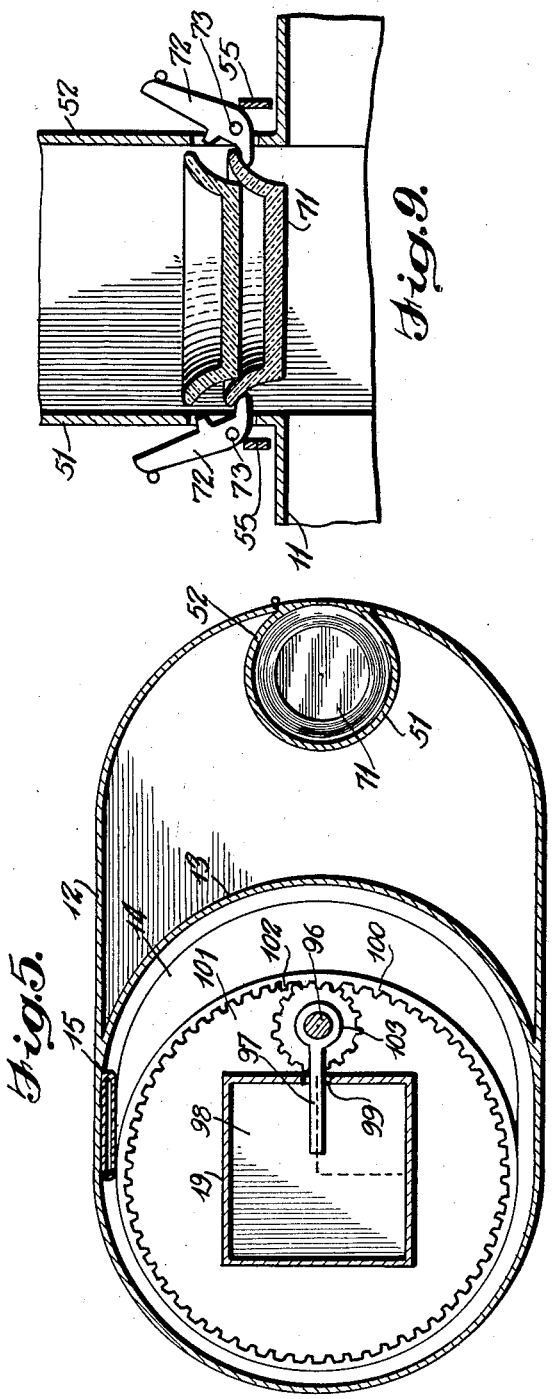

Patented Mar. 7, 1950

2,499,660

UNITED STATES PATENT OFFICE 2,499,660

SANITARY BUTTER CUTTER

Donald Clyde Lutz, Los Angeles, Calif.

Application January 28, 1947, Serial No. 724,773

6 Claims. (Cl. 31—6)

This invention relates to an automatic self-serving butter machine, and the primary object of the invention is to provide a machine of this type that will provide the sanitary self-serving of butter in hotels, restaurants or any other establishment where butter is served.

Another object of the invention is to provide a machine that can be operated by hand or by an electric motor, and is provided with a cooling unit that can be connected to any refrigerator having a thermostatic control which will maintain the desired temperature for the preserving of the butter contained therein.

With the above and other objects and advantages in view, the invention consists of the novel details of construction, arrangement and combination of parts more fully hereinafter described, claimed and illustrated in the accompanying drawings in which:

Figure 1 is a side elevational view, partly broken away, of an embodiment of the invention;

Figure 2 is a vertical sectional view taken forwardly of the central vertical axis of Figure 1;

Figure 3 is a detailed sectional view of the lower half of the device;

Figure 4 is a sectional view on the line 4—4 of Figure 2;

Figure 5 is a sectional view on the line 5—5 of Figure 2;

Figure 6 is a sectional view on the line 6—6 of Figure 2;

Figure 7 is a sectional view on the line 7—7 of Figure 2;

Figure 8 is a sectional view on the line 8—8 of Figure 2;

Figure 9 is a sectional view on the line 9—9 of Figure 2.

Referring more in detail to the drawings, the reference numeral 10 generally designates the butter cutter which, as illustrated, is constructed in accordance with the invention, having an elongated rectangular shaped hollow base portion 11, which is formed integral with the side walls and rear wall of the housing 12.

The housing 12 is provided with a semi-circular partition 13 in the forward part thereof, which forms the cooling chamber 14, the cooling being effected by a helical water cooling coil 15 arranged within the chamber 14, and provided at one end with a tap 16.

The top of the housing 12 is provided with an opening 17 having a depending flange 18, and vertically positioned in the chamber 14, and resting on the bottom of the housing 12, is an elongated square shaped in cross section tube 19, which is shaped to conform to a stick of butter 20. The tube 19 is open at its upper end, which is in alinement with the opening 17 in the housing 12, and the upper end of the tube 19 is closed by the flanged cover 21 having a handle 22 thereon for the removal thereof.

Formed integrally with the bottom of the tube 19 is a ring gear 23 which is adapted to engage with the spur gears 24 mounted on shafts 25 and 26 respectively, which are journalled in ball bearing races 27 mounted in the housing 12, and shaft 25 has an enlarged head 28 mounted on its free end, while shaft 26 has a ratchet tooth disc 29 mounted on its free end. The disc 29 engages the ratchet teeth 30 formed on one side of the gear 31 on the axle 32, which is journalled in the bearing housing 33 on the side of the housing 12, and a coil spring 34 on the axle 32 forces the teeth 30 into engagement with the teeth on the disc 29.

The gear 31 engages a rack bar 35 which is slidably mounted in the horizontal guide way 36 in the housing 12. Formed on the opposite end of the bar 35 in vertical depending relation thereto is an arm 37 having an elongated slot 38 at its lower end, which engages with the stud 39 on the crank 40 secured to one end of the shaft 41, on which is mounted the cam disc 42. The shaft 41 is journalled at one end in the bearing 43 formed on the inner surface of the housing 11, and a bearing support 44 secured to the bottom surface of the housing 12 supports the other end of the shaft inwardly of the crank 40. Upon rotation of the cam disc 42, it will engage the cam face 45 of the butter cutter 46, slidably mounted in the trackway 47, and provided with the forwardly extending knife or cutter 48 which has horizontal sliding movement into and out of engagement with the butter 20 in the tube 19 by means of the opening 49 in the bottom of the housing 12, and a coil spring 50 connected to the wall 51 of the circular housing 52 which is fixed to the housing 12 inwardly thereof, in vertical parallel relation therewith, and to the cutter 48, returns the cutter to normal position after the cutting operation.

The cam disc 42 is provided with a pin 53 which engages the cam faces 54 of the parallel arms 55 which are pivoted on the pin shafts 56, which are journalled in the support 57 fixed to the bottom of the housing 11, and bracket 58 on the motor supporting shelf 59 secured to the inner wall of the housing 11 for supporting the motor 60, and movement of the arms 55 will, by means of the elongated slots 61 in one end thereof, engaging the pins 62 in the stem 63 of the butter server 64, slide the server downwardly in the elongated slot 65 on the trackway 66, which is secured by means of base 67 to the housing 12. The slotted trackway 66 permits movement of the pins 62, and a pin 68 on the end of the stem 63 engages the curved slotted trackway 69 to invert the server 64 to deposit a butter cube 70 into the butter dish 71. As the butter server is depositing butter in the dish 71, the arms 55, at their opposite ends, are engaging the pivoted keepers 72 to release a butter dish 71 from a stack of similar dishes in the housing 52, and the keepers 72, which are mounted by means of pins 73 in the housing 52, will permit only one dish 71 to be fed at a time to the belt conveyor 74 carried by flanged rollers 75, the axles 76 of which are journalled in the side walls of the base 11. One of the arms 55 is provided with an arcuate shaped depending rack bar 77, which engages the gear 78 loosely mounted on the axle 79 journalled in bearings 80 formed in vertical parallel relation to each other on the inner surface of the bottom of the base 11. The gear 78 carries a spring pressed dog 81 which engages the ratchet 82 fixed to the axle 79. In its downward movement, the rack 77 freely rotating the gear 78, but on its upward movement, the dog 81 engages the ratchet 82 to rotate the axle 79 to rotate the gear 83 engaging the chain 84 in mesh with the gear 85 on the rear shaft 76 will rotate the rollers on the shafts to cause the belt 74 to travel over the plate 86 in a forward direction to carry the dish 71 outwardly of the housing 12 through the opening 87 formed therein. The top opening 88 in the base 11 permits access to the dish 71, as shown in Figure 2. The operation previously described is caused by means of the gear 89 on the shaft 41 meshing with the gear 90 on the drive shaft 91 of the motor 60, which is energized by depressing the button switch 92, which is connected to a source of electric current through the plug 93, and to the motor 60 by wires 94.

During the reciprocation of the rack bar 35, the gear 31 will, by means of the teeth 30 thereon, rotate the disc 29 in one direction, causing the tube 19 to rotate to bring the butter 20 into position for engagement with the knife 48 by means of the opening 49 in the tube for the severance thereof, and to permit the butter to be deposited on the server 64. Journalled at one end in the gear 23 and at the other end in a bracket 95 formed on the tube 19, is a vertical screw 96 having the travelling support 97 thereon to which is fixed within the tube 19, a square shaped follower 98 which conforms to the inner shape of the tube 19. The support 97 enters through the vertical slot 99 in the tube, and the gear tube and screw revolve as a unit about the axis of the gear 23.

A gear housing 100 is formed on the bottom of the housing 12, and is provided with an opening 101 in the top thereof, having teeth 102 formed on its periphery. The teeth 102 mesh with a gear 103 keyed to the lower end of the screw 96, and as the gear 23 rotates, the gear 103 will mesh with the teeth 102, and cause rotation of the screw 96 and movement of the follower 98.

A refrigerator unit 104 that does not require the use of a compressor is mounted in the housing 12 for the cooling of the water in the coil 15.

The device as described will maintain the butter in proper condition to be served. The butter is cut in small squares, placed on a butter dish, and delivered outwardly of the housing for service to patrons.

It is believed that from the foregoing description, the operation of the device will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A device of the character described, comprising a housing having a compartment therein, cooling coils in said compartment, a square-shaped tube in the compartment for holding a piece of butter therein, a gear means on the lower end of said tube, spur gear means in said housing in engagement with said first gear means, a second gear means in said housing parallel to and spaced from said spur gear means, rack means engaging said second gear means, coacting ratchet teeth discs carried by said spur gear means and said second gear means respectively, whereby operation of said rack means will cause the rotation of said first gear means, a depending arm on said rack means, cutting means carried by said housing for passage under said tube to cut said butter, a cam face on said cutting means, a motor operated cam engageable with said cam face for the operation of said cutting means, a shaft for mounting said cam, a crank arm on said shaft, a pin on said crank arm engaging the arm on said rack means so that said cutting means and said rack means will operate in coacting relation with each other, a circular compartment in said housing at the rear thereof containing a stack of butter dishes, conveyor means in the bottom of said housing below said compartment and extending outwardly of said housing for delivering a dish from said circular compartment under said butter, means operated by said cam for depositing said butter into said dish as it is delivered under said tube by said conveyor means, and said conveyor means being adapted to carry said dish outwardly of said housing.

2. The invention as in claim 1 wherein follower means is provided in said tube in contact with said butter for forcing said butter downwardly of said tube to be cut, and said follower means is carried by a screw means carried by said first gear means.

3. The invention as in claim 1 wherein means is provided for coaction with said conveyor means for lowering one dish at a time from said stack onto said conveyor means.

4. The invention as in claim 1 wherein means is provided for coaction with said conveyor means and said means for delivering butter to said dish for lowering one dish at a time from said stack onto said conveyor means.

5. The invention as in claim 1 wherein spring means is carried by said housing and connected to said cutting means for returning said cutting means after it has been advanced by said cam.

6. The invention as in claim 1 wherein a tooth gear housing is provided in said first housing above said first gear means, a feed screw is carried by said first gear means, and means is provided on said feed screw for coacting with said toothed gear housing and follower means carried by said feed screw adapted to engage said butter to force said butter downwardly in said tube during the rotation of said first gear means.

DONALD CLYDE LUTZ.

REFERENCES CITED

The following references are of record in the file of this patent:

UNITED STATES PATENTS

| Number | Name | Date |
|---|---|---|
| 1,159,688 | Larson | Nov. 9, 1915 |
| 1,216,624 | Straight | Feb. 20, 1917 |
| 1,580,498 | Knox et al. | Apr. 13, 1926 |
| 1,758,257 | Kaskouras | May 13, 1930 |
| 2,250,760 | Gratcyk et al. | July 29, 1941 |